United States Patent [19]

Hu et al.

[11] Patent Number: 5,379,136
[45] Date of Patent: Jan. 3, 1995

[54] ELECTRON BEAM ADDRESSED ELECTRO-OPTICAL LIGHT VALVE HAVING INPUT OPENINGS

[76] Inventors: Shouxiang Hu, 2500 Q St., NW. #647, Washington, D.C. 20007; Yanping Guo, 8808 Lanier Dr. #201, Silver Spring, Md. 20910

[21] Appl. No.: 130,700
[22] Filed: Oct. 4, 1993
[51] Int. Cl.⁶ .................. G02F 1/133; H01J 31/24
[52] U.S. Cl. ..................... 359/47; 359/87; 359/262; 313/465; 348/466; 348/768
[58] Field of Search ............ 359/47, 87, 82, 83, 359/254, 256, 262; 313/398, 399, 465; 348/766, 768, 809

[56] References Cited

U.S. PATENT DOCUMENTS

| | | | |
|---|---|---|---|
| 4,150,876 | 4/1979 | Yevick | 359/72 |
| 4,387,964 | 6/1983 | Arrazola et al. | 359/47 |
| 4,728,174 | 3/1988 | Grinberg et al. | 359/47 |
| 4,826,293 | 5/1989 | Grinberg et al. | 359/47 |
| 4,838,651 | 6/1989 | Pottharst et al. | 359/47 |
| 4,884,874 | 12/1989 | Buzak et al. | 359/47 |
| 5,076,670 | 12/1991 | Sayyah | 359/84 |

FOREIGN PATENT DOCUMENTS 8501362 3/1985 WIPO .................. 359/47

OTHER PUBLICATIONS

I. F. Chang "Electron–Beam Addressable Liquid Crystal Display with Storage Capability" IBM Technical Disclosure Bulletin–vol. 16–No. 1–Jun. 1973–pp. 353–354.

*Primary Examiner*—William L. Sikes
*Assistant Examiner*—Tai V. Duong

[57] ABSTRACT

An electron beam addressed electro-optical (EO) light valve (EOLV) having a matrix of openings formed on and extending through an input conductive layer and further extends into an electrically insulating layer. A partially conductive coating is formed on the surface of each opening in the insulating layer, and has a substantially good electrical contact with the input conductive layer. An EO layer, formed of either a liquid crystal (LC) or a solid state EO crystal, is positioned on the optical output side of the insulating layer. Through the openings electrons from a scanning electron beam can reach and be directly deposited on the partially conductive coatings at a depth substantially close to the EO layer and substantially far away from the input conductive layer. The insulating material surrounding the openings in the insulating layer strictly prevents these deposited electrons from inter-opening motion. These deposited electrons are then discharged along the partially conductive coatings to the input conductive layer before the next scanning cycle. Accordingly, a precisely controllable voltage across each pixel of the EO layer can be obtained. This makes it possible to obtain a precisely controllable orientation state of the molecules in each pixel of the EO layer corresponding to the modulation of the scanning electron beam. Thus an EOLV with significantly high resolution, high contrast ratio, fast response speed, high display gray scale and high sensitivity responding to the input modulation can be achieved according to this invention.

20 Claims, 4 Drawing Sheets

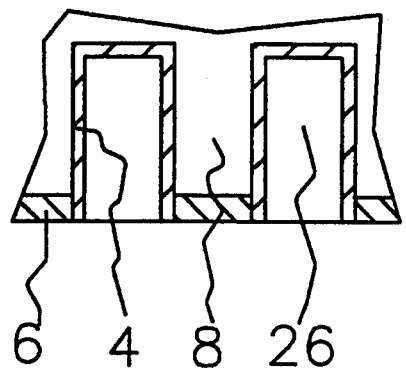
Fig.3.a
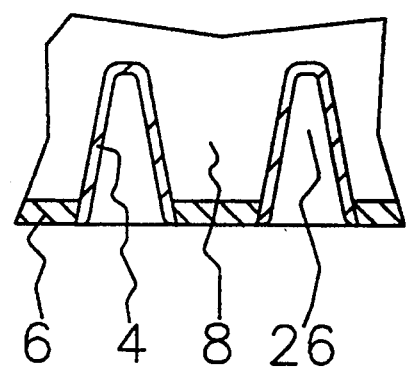
Fig.3.b
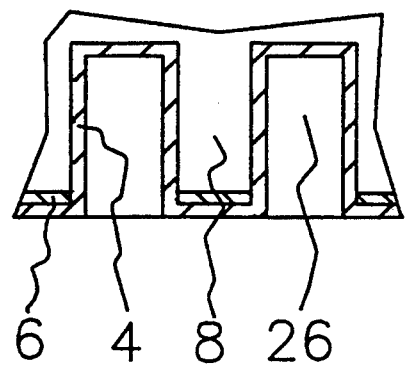
Fig.3.c
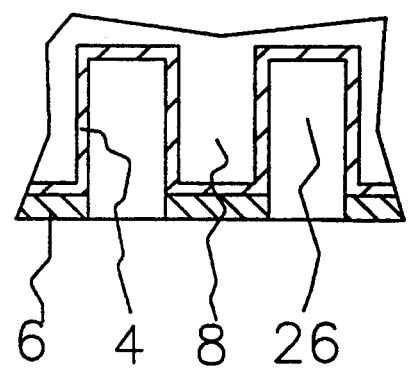
Fig.3.d

ELECTRON BEAM ADDRESSED ELECTRO-OPTICAL LIGHT VALVE HAVING INPUT OPENINGS

BACKGROUND OF THE INVENTION

1. Field of the Invention

This invention relates to electro-optical light valves (EOLV), and more particularly to light valves which spatially modulate a readout optical beam corresponding to the modulation of a scanning electron beam.

2. Description of the Related Arts

EOLVs have many important applications. One of them is in large screen displays. Based on the electro-optical (EO) effect of an EO layer, such as that made from a solid state EO crystal or from a liquid crystal (LC), a polarized incident light may change its polarization after passing through the EO layer as a result of the application of an appropriate electric field across the EO layer. An EOLV commonly modulates the intensity or polarization of a readout optical beam by writing a corresponding voltage pattern across the EO layer. Several means of voltage pattern writing have emerged. Among them, EOLVs with passive matrix addressing are small in size, but have long response time, low resolution and low optical output; EOLVs with active matrix addressing are a big improvement over those with passive matrix addressing in many aspects, but they still suffer from low optical output, and the related thin film transistor (TFT) matrix is extremely difficult to manufacture at the necessary total resolution; EOLVs with optical scanning on a photo-electric layer through a scanning laser beam or through an optically coupled CRT may have shorter response time and higher resolution than those with matrix addressing, however, they still need additional means to generate the primary light pattern and a multilayer construction to isolate the readout light from the writing light; EOLVs with electron beam addressing have the advantage over all of the previous ones in having high response speed and high resolution without the need for a primary light pattern and for a light isolating multilayer construction.

Earlier type electron beam addressed EOLVs used the secondary electron emission effect under electron beam bombardment to write the voltage pattern. This type of devices is described, for example, in Puan A. Haven, "Electron-Beam Addressed Liquid Crystal Light Valve", IEEE Transaction on Electron Devices, Vol. ED-30, page 489–492 (1983), and in Thomas S. Buzak, et al., "Method of Addressing Display Regions in an Electron-Beam Addressed Liquid Crystal Light Valve", U.S. Pat. No. 4,884,874. This type of devices needs a flood gun or an erasing gun to erase the voltage pattern before the next scanning cycle. This requirement severely limits its achievable resolution. Jan Grinberg, et al., in U.S. Pat. No. 4,728,174, used a partially conductive layer to receive charges from an electron beam to generate the voltage pattern across an LC layer, and the charges are discharged through a conductive grid deposited on the partially conductive layer. As the most active charging and discharging paths are on the input surface of the partially conductive layer, and as this surface is in the proximity of the conductive grid, the conductive grid tends to pin the voltage across the LC layer to an average value. To reduce the voltage pinning effect, the grid openings need to be as large as possible, but this may have the adverse effect of blurring the voltage pattern as the deposited charges spread laterally on their way of discharging to the conductive grid. This apparently obstructs the achievement of high resolution. In their efforts to improve the system, Jan Grinberg, et al., in U.S. Pat. No. 4,826,293, replaced the conductive grid with a thin conductive sheet. However, even with a substantially high voltage electron beam, the distance to which elections impinge into the partially conductive layer after penetrating through the conductive sheet is only about 1–2 $\mu$m. The impinged charge layer is so close to the conductive sheet that an image charge pattern with opposite charges is induced on the inner surface of the conductive sheet, which may severely reduce the intensity of the electric field in the LC layer generated by the impinged charges, leading to the blurring of the voltage image across the LC layer. It is also noted that an electron beam with too high voltage may cause excess heat in the nearby LC layer, accelerating its degradation. It is now obvious that, in order to improve the sharpness of the voltage pattern across the LC layer, the deposited or impinged charges need to be substantially closer to the LC layer and substantially farther away from the conductive input layer.

SUMMARY OF THE INVENTION

An objective of the present invention is to provide an EOLV having high resolution, high contrast ratio, and short response time, eliminating the need for a flood gun or an erase gun and a high voltage electron beam.

Another objective of this invention is to provide in such an EOLV high display gray scale and high sensitivity responding to the input modulation.

These objectives are achieved by means of an EOLV with openings on its input layers. The EOLV has a scanning electron beam input side and an optical output side. A matrix of the openings is formed on and extends through an input conductive layer and further extends into an electrically insulating layer. A partially conductive coating is formed on the surface of each opening in the insulating layer, and has a substantially good electrical contact with the input conductive layer. An EO layer, formed of either a liquid crystal (LC) or a solid state EO crystal, is positioned on the optical output side of the insulating layer. Electrons from a scanning electron beam enter the openings and are deposited on the partially conductive coatings, establishing a spatially modulated voltage image across the EO layer corresponding to the modulation of the scanning electron beam. The spatially voltage-modulated EO layer further modulates a readout optical beam, leading to a desired optical image output. Electrons deposited on the partially conductive coatings are then discharged fast enough along these coatings to the input conductive layer before the next scanning cycle.

Through the openings electrons from the scanning electron beam, even from one with substantially low voltage, can reach and be directly deposited on the partially conductive coatings at a depth substantially close to the EO layer and substantially far away from the input conductive layer. The insulating material surrounding the openings in the insulating layer strictly prevents these deposited electrons from inter-opening motion. Therefore, a significantly sharp voltage image can be established across the EO layer according to this invention, leading to an optical image output with significantly high resolution and high contrast ratio. As the number of electrons deposited on the coating of each opening can be easily controlled with substantially high precision by controlling the scanning electron beam, and as these electrons cannot move across the openings, a precisely controllable voltage across each pixel of the EO layer can be accordingly obtained. This makes it possible to obtain a precisely controllable orientation state of the molecules in each pixel of the EO layer. Thus an optical image output with significantly high gray scale and high sensitivity responding to the input modulation can be achieved according to this invention.

DESCRIPTION OF THE DRAWINGS

FIGS. 3.a–d are enlarged sectional views showing (FIG. 3.a) a basic form of the input opening structure and (FIGS. 3b–d) their alternative forms.

DETAILED DESCRIPTION OF THE INVENTION

Figure 1:
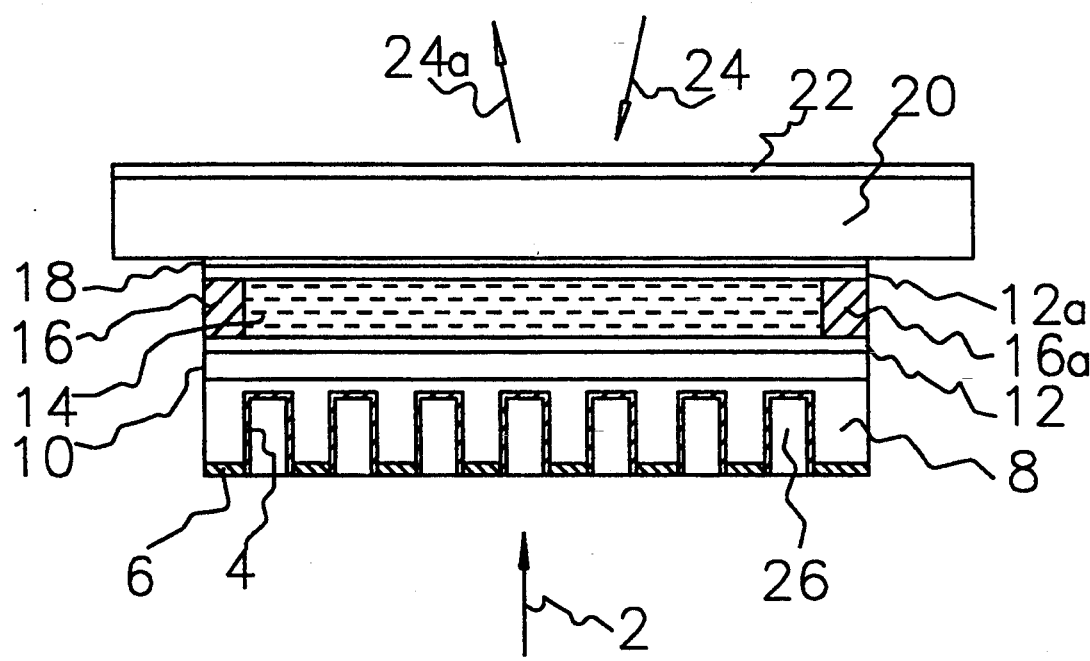
FIG. 1 is a sectional view of an EOLV constructed in accordance with the invention as its first embodiment involving an LC layer.
Figure 2:
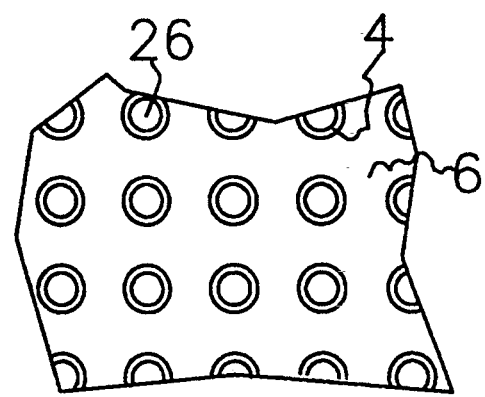
FIG. 2 is a fragmentary plane view showing a portion of the input conductive layer with openings shown in FIG. 1 of the drawings.

An electron beam addressed EOLV as the first embodiment of this invention is shown in FIG. 1. In this embodiment the EO layer 14 is formed of a liquid crystal sandwiched between two alignment layer 12 and 12a with blocks 16 and 16a serving for spacing and sealing purposes. A transparent electrode 18 is introduced between the alignment layer 12a and a transparent faceplate 20 having an anti-reflection film 22. A dielectric mirror 10 is provided between the alignment layer 12 and an electrically insulating layer 8 having a matrix of openings 26, also shown in FIG. 2. The openings 26 are extended into the insulating layer 8, reaching to a depth of being substantially close to the dielectric mirror 10, and, conversely, extended through an electrically conductive layer 6 facing an oncoming scanning electron beam 2. Coatings 4 made of a partially conductive material are applied on the surfaces of said openings inside the conductive layer 6 and the insulating layer 8. FIG. 3.a shows the basic structure of the openings 26 with the coatings 4, in which a substantially good electrical contact is ensured between the partially conductive layer 6 and the partially conductive coatings 4.

Figure 4:
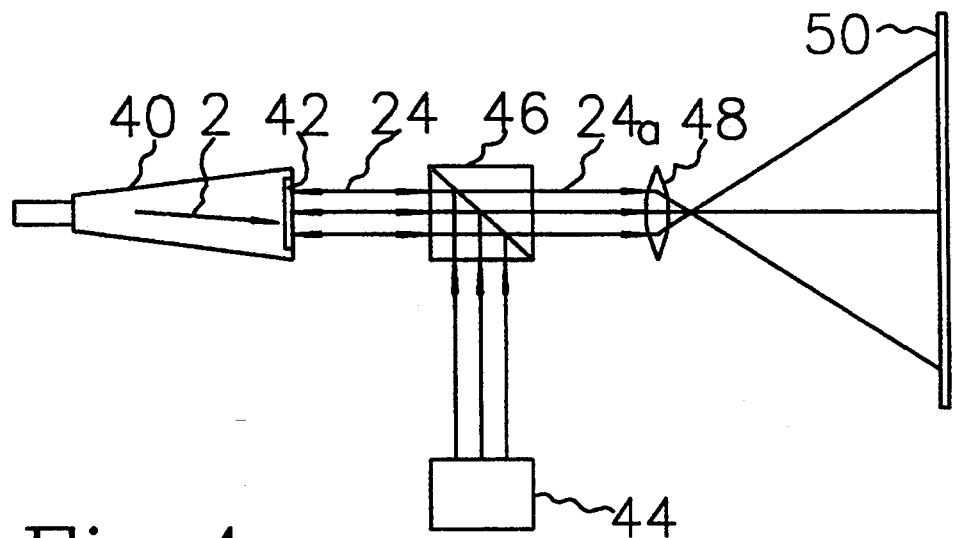
FIG. 4 is a schematic sectional view of an electron beam addressed EOLV projection system.

FIG. 4 is a schematic sectional view for illustrating the fundamental construction and operation of an electron beam addressed EOLV projection system involving an LC light valve (LCLV) 42 such as the one shown in FIG. 1. According to a combination of FIG. 1 and FIG. 4 the LCLV 42 is integrated with a cathode ray tube (CRT) 40, in which electrons from the scanning electron beam 2 enter the openings 26 and are deposited on the partially conductive coatings 4, establishing a spatially modulated voltage across the LC layer 14. The orientations of the molecules in the LC layer 14, initially aligned in an alignment states such as the 45° twist state by the two alignment layers 12 and 12a, are then modulated by the established spatially modulated voltage. An optical readout beam 24, generated by a light source 44, and polarized and reflected by a polarizer/beam splitter prism 46, is incident on the LCLV 42. The light passes through the LC layer 14, and is thereafter reflected by the dielectric mirror 10 and again passes through the LC layer 14, and then reaching the polarizer/beam splitter prism 46 for a second time. This time, however, the polarizer/beam splitter prism 46 functions as a analyzer with its polarizing axis being perpendicular to the polarization of the light beam 24 before entering the LCLV 42. If the voltage across a pixel of the LC layer established by the electrons entering the corresponding opening is lower than a certain threshold value, the initial alignment state remains unchanged. In this case, the polarization of the light after passing through the LC layer for the second time is rotated back to the direction of its original polarization before entering the LC layer the first time. Thus, after the light interacts with the polarizer/beam splitter prism 46, there will be no optical output from this pixel. As the voltage across the pixel of the LC layer is increased, the molecules with positive dielectric anisotropy in the pixel of the LC layer begin to tilt toward the alignment along the electric field direction. With the distortion of the molecular alignment and up to a certain voltage range, the optical birefringence of these molecules can cause the light to become no longer linearly polarized after it has passed through the LC layer for the second time. At this stage, a portion of the light can accordingly pass through the polarizer/beam splitter prism 46, and is projected onto a screen 50 through an optical projection device 48.

Through the openings 26, electrons from the scanning electron beam 2 can be deposited directly on the partially conductive coatings 4 at a depth substantially close to the LC layer 14 and substantially far away from the input conductive layer 6. The inter-opening movement of the deposited electrons is effectively prevented by the insulating walls surrounding the openings in the insulating layer 8, as if the electrons entering each opening act independently of the electrons entering any other openings. All of these factors contribute to a very sharp voltage image formed across the LC layer, leading to an optical image output having significantly high contrast ratio and high resolution. As the electrons are not required to penetrate through a conductive sheet and to impinge into a partially conductive layer, the number of electrons entering each opening 26 and deposited on the corresponding partially conductive coating 4 can be precisely controlled by controlling the current of the scanning electron beam. A precisely controllable voltage within a substantially wide voltage range across each pixel of the LC layer can be accordingly achieved. The precisely controlled voltage in turn precisely controls the alignment state of the molecules in each pixel of the LC layer, leading to the optical image output having a significantly high gray scale and high sensitivity responding to the input modulation in addition to the advantages cited above.

The deposited electrons entering each opening may be discharged either through the corresponding partially conducive coating to the conductive layer 6 or through the dielectric mirror and the LC layer to the transparent electrode 18. The discharging time through each discharging path depends on the charge dissipation time constant $\tau$ of that path. As $\tau = \rho \epsilon$, here $\rho$ is the resistivity and $\epsilon$ the dielectric constant, the typical values of $\tau$ for a dielectric mirror and a LC layer commonly used for display purpose are at least about 200 s and 40 ms, respectively. Accordingly, discharging through the path of the dielectric mirror and the LC layer is too slow for real time display. Therefore the deposited electrons need to be discharged only through the path of the partially conductive coating 4 to the conductive layer 6, and the time constant of the partially conductive coating needs to be small enough for the electrons to be discharged before the next scanning cycle. However this time constant should not to be too small, as it is necessary to sustain the voltage modulation for a sufficiently long time to obtain an adequately modulated optical output. For the HDTV display with a field rate of 100 Hz and a frame rate of 50 Hz, the material for the partially conductive coatings may have a charge dissipation time constant of about 10–20 ms. In this embodiment, however, as the EO layer is formed of an LC, the relaxation time of the LC layer has to be taken into account, and the real time constant for the partially conductive coatings should be about 5–15 ms. If the material has a dielectric constant of about $5 \times 10^{-11}$ farad/m, then its resistivity needs to be about $1 \times 10^8 - 3 \times 10^8$ ohm-m. Materials of this type include, for instance, appropriately doped $SiO_2$, $As_2Se_3$, $Y_2O_3$, and $Si_3N_4$, among others.

FIG. 3.a shows the enlarged basic structure of the coated openings. The openings can be made either through common etching techniques, or through common micro-drilling techniques, such as laser drilling. The openings in FIG. 3.a are column-shaped, but more practically they can be shaped as tapered cylinders with their mouths, facing the electron beam 2, being substantially wider than their ends in the insulating layer 8, as shown in FIG. 3.b. One easy way of forming the opening structure, for instance, is to produce the insulating layer 8 and the conducive layer 6 first, then make the openings in the conductive layer 6 and extend them deep into the insulating layer, and finally deposit the partially conductive coatings 4 on these openings. The excess coating on the input side surface of the conductive layer 6, facing the electron beam 2, may then be removed, or may be simply left there, as shown in FIG. 3.c, as it is very thin, having no significant adverse effect on the scanning electron beam. The opening structure can also be made as illustrated in FIG. 3.d, in which case the openings and coatings are first produced in the insulating layer 8 and then the conductive layer 6 is formed through a tilt metal molecular beam deposition, as the tilt deposition technique can effectively prevent the metal molecular beam from reaching the deep depths of the openings in the insulating layer 8. The openings can also be square-rob-shaped, and become narrower, or at least no wider, along the direction leading from the input side to the optical output side.

The insulating layer can be made, for instance, of one of a group of materials comprising high purity $Al_2O_3$, MgO, BeO, BN, and $SiO_2$, among others. For mass production, the insulating layer can also be made of plastic materials, such as polycarbonate, and the openings in it can be formed through a mastering process using a molding press, similarly to the method commonly used to produce optical disks.

As an example, the insulating layer formed is 22 $\mu m$ thick; the openings are 20 $\mu m$ in diameter and 20 $\mu m$ in depth into the insulating layer 8; the partially conductive coatings 4 are 1 $\mu m$ in thickness; the center to center spacing between two adjacent openings is 30 $\mu m$, leaving the insulating walls surrounding the openings no thinner than 10 $\mu m$ each; and the conductive layer is made out of a metal, such as Al, Ag, and Au, and is 1 $\mu m$ in thickness. With an LCLV having such an opening structure with dimensions of 3.75 cm $\times$ 2.85 cm, an HDTV-style resolution of 1250 $\times$ 950 pixels can easily be achieved.

Figure 5:
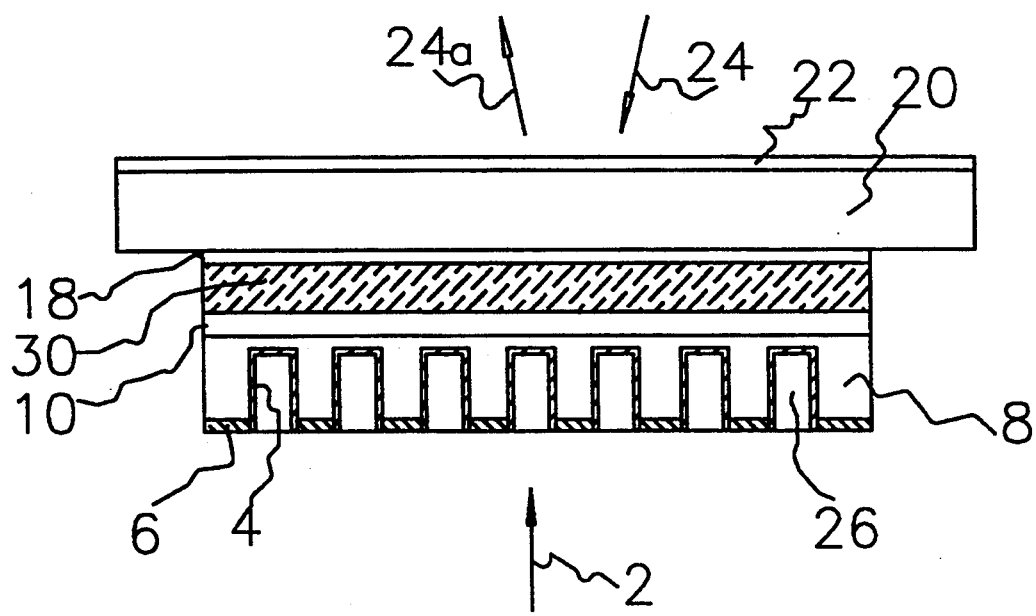
FIG. 5 is a sectional view of an EOLV for a second embodiment of the invention involving a solid state EO layer.

In the second embodiment of the invention, as shown in FIG. 5, the EO layer 30 is made of a solid state crystal, such as $LiNbO_3$, $LiTaO_3$, or $KD_2P$. It may also be made of a polycrystalline EO film, such as a PLZT film. Although a solid state EO layer is commonly more expensive to produce and requires higher driving voltage than the one of an LC, it has some important advantages over the LC layer in stability and response speed. Since a significantly large number of electrons can be directly deposited through the openings on the partially conductive coatings at a depth substantially close to the EO layer, a sufficiently high driving voltage, which is required for the solid state light valve, can easily be obtained using this invention.

Figure 6:
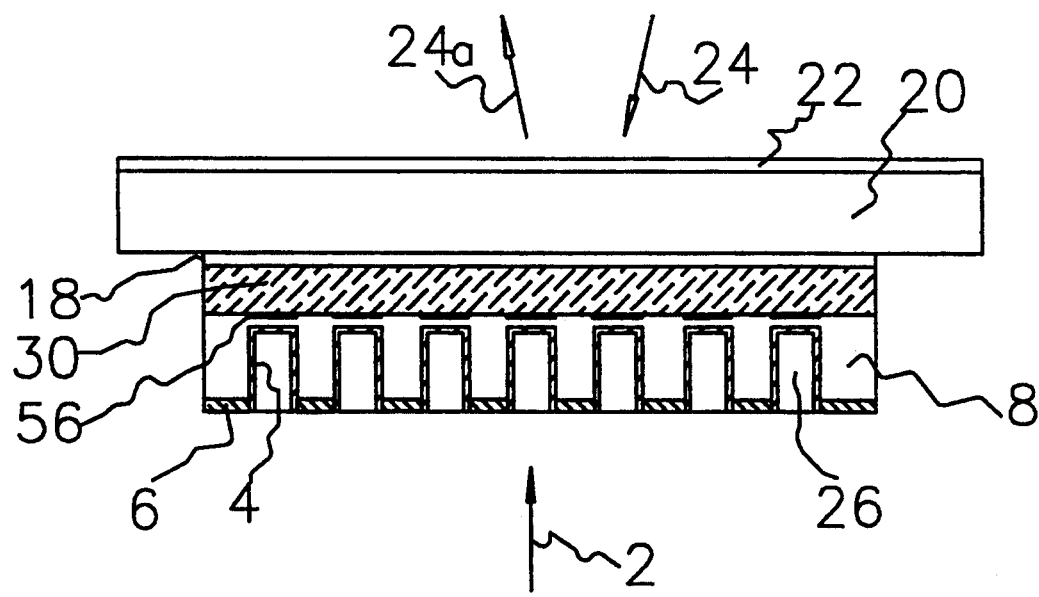
FIG. 6 is an EOLV for a third embodiment of the invention involving a metal dot-matrix mirror.
Figure 7:
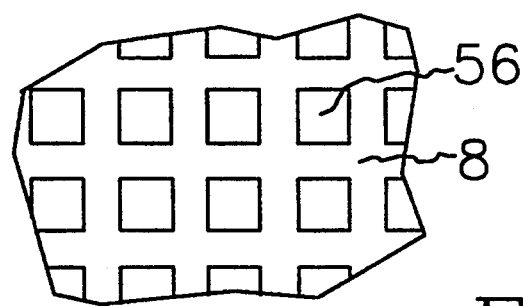
FIG. 7 is a fragmentary plan view showing a portion of the metal dot-matrix mirror shown in FIG. 6 of the drawings.

In the third embodiment of an EOLV according to the present invention, the dielectric mirror 10 of FIG. 5 is replaced by a metal dot-matrix mirror 56, as shown in FIG. 6 and FIG. 7. In this case the ends of the openings 26 in the insulating layer 8 are closer to the EO layer than in the previous embodiments. This contributes to a further improvement in the quality of the optical display.

In some cases, such as the one which requires a support membrane, additional one or more insulating layers are introduced between the EO layer and the original insulating layer. In this case the input openings may extend throughout the entire thickness of the original insulating layer, or may further extend into the additional one or more insulating layers. Therefore, the insulating layer 8 in all of the above embodiments can be generally regarded as a sequence of one or more insulating layers, and the input openings are formed on the input side of the sequence and extend into the sequence.

Circuit means (not shown) used to connect the transparent electrode 18 and the input conductive layer 6 are provided for removing electric charges received by the conductive layer 6 from the partially conductive coatings 4, and for establishing a voltage bias across the EO layer. The voltage bias may be DC or AC, but AC bias is preferred in the case of the EO layer being made of an LC, as DC bias in this case may cause severe degradation of the LC layer. The value of the bias voltage can be set between 0 and the threshold voltage of the EO layer, depending on the desired sensitivity.

While several illustrative embodiments of the invention having been shown and described, numerous variations and alternate embodiments will occur to those skilled in the art, without departing from the spirit and scope of the invention. As an example, the invention could be implemented with a transmissive EOLV rather than the reflective device illustrated. As a second example, in the case of the width of the addressing area being substantially large relative to the distance between the electron gun and the input layer, the input layers may be curved and the orientations of the cylinder-shaped input openings may be varied, or the trajectories of the oncoming electron beam may be modified, so that each of the openings can still have an equal capability to access the oncoming electron beam. It is preferred, therefore, that the present invention not be limited by specific disclosure herein, but only by the appended claims.

What is claimed is:

1. An electro-optical light valve (EOLV) having an input side and an optical output side, and addressed by a writing scanning electron beam on the input side and by a readout optical beam on the optical output side, comprising:
   (a) an electro-optical (EO) layer addressable by the readout optical beam,
   (b) a transparent electrode on the optical output side of said EO layer,
   (c) an electrically insulating layer on the input side of said EO layer,
   (d) a matrix of openings formed on the input side of said insulating layer and extending into said insulating layer,
   (e) a conductive layer on the input side of said insulating layer, having a matrix of openings extending throughout the entire thickness of said conductive layer and matching said matrix of openings in said insulating layer,
   (f) a partially conductive coating formed on the surface of each of said openings in the insulating layer, having a substantially good electric contact with said conductive layer, whereby electric charges deposited on the surfaces of the coated openings in said insulating layer can spatially modulating the voltage across said EO layer as a result of said scanning electron beam entering the coated openings, said electric charges then being discharged through the partially conductive coatings to said conductive layer before the next scanning cycle, and
   (g) circuit means for removing electric charges received by said conductive layer from the partially conductive coatings and for establishing a bias voltage across said EO layer.

2. The EOLV of claim 1, said EO layer being formed of a liquid crystal.

3. The EOLV of claim 1, said EO layer being formed of a solid state EO film.

4. The EOLV of claim 1, further comprising a dielectric mirror between said EO layer and said insulating layer, for reflecting the readout optical beam.

5. The EOLV of claim 1, further comprising a metal dot-matrix mirror between said EO layer and said insulating layer for reflecting the readout optical beam.

6. The EOLV of claim 1, wherein said insulating layer is formed from one of a group of materials comprising of high purity $Al_2O_3$, MgO, BeO, BN, and $SiO_2$.

7. The EOLV of claim 1, wherein said insulating layer is formed of plastic materials.

8. The EOLV of claim 7, wherein the openings in said insulating layer are formed through a mastering process using a molding press.

9. The EOLV of claim 1, said openings being cylinder-shaped and becoming narrower, or at least no wider, along the direction leading from the input side to the optical readout side.

10. The EOLV of claim 1, said openings being square-rob-shaped, and becoming narrower, or at least no wider, along the direction leading from the input side to the optical output side.

11. An electro-optical light valve (EOLV) having an input side and an optical output side, and addressed by a writing scanning electron beam on the input side and by a readout optical beam on the optical output side, comprising:
   (a) an electro-optical (EO) layer addressable by the readout optical beam,
   (b) a transparent electrode on the optical output side of said EO layer,
   (c) a sequence of one or more electrically insulating layers on the input side of said EO layer,
   (d) a matrix of openings formed on the input side of said sequence and extending into said sequence,
   (e) a conductive layer on the input side of said sequence, having a matrix of openings extending throughout the entire thickness of said conductive layer and matching said matrix of openings in said sequence,
   (f) a partially conductive coating formed on the surface of each of said openings in said sequence, having a substantially good electric contact with said conductive layer, whereby electric charges deposited on the surfaces of the coated openings in said sequence can spatially modulating the voltage across said EO layer as a result of said scanning electron beam entering the coated openings, said electric charges then being discharged through the partially conductive coatings to said conductive layer before the next scanning cycle, and
   (g) circuit means for removing electric charges received by said conductive layer from the partially conductive coatings and for establishing a bias voltage across said EO layer.

12. The EOLV of claim 11, said EO layer being formed of a liquid crystal.

13. The EOLV of claim 11, said EO layer being formed of a solid state EO film.

14. The EOLV of claim 11, further comprising a dielectric mirror between said EO layer and said sequence, for reflecting the readout optical beam.

15. The EOLV of claim 11, further comprising a metal dot-matrix mirror between said EO layer and said sequence for reflecting the readout optical beam.

16. The EOLV of claim 11, wherein at least one of said one or more insulating layers in said sequence is formed from one of a group of materials comprising of high purity $Al_2O_3$, MgO, BeO, BN, and $SiO_2$.

17. The EOLV of claim 11, wherein at least one of said one or more insulating layers in said sequence is formed of plastic materials.

18. The EOLV of claim 17, wherein the openings in said sequence are formed through a mastering process using a molding press.

19. The EOLV of claim 11, said openings being cylinder-shaped and becoming narrower, or at least no wider, along the direction leading from the input side to the optical readout side.

20. The EOLV of claim 11, said openings being square-rob-shaped, and becoming narrower, or at least no wider, along the direction leading from the input side to the optical output side.

* * * * *